(12) United States Patent
Choe et al.

(10) Patent No.: US 10,915,766 B2
(45) Date of Patent: Feb. 9, 2021

(54) METHOD FOR DETECTING CLOSEST IN-PATH OBJECT (CIPO) FOR AUTONOMOUS DRIVING

(71) Applicant: Baidu USA LLC, Sunnyvale, CA (US)

(72) Inventors: Tae Eun Choe, Sunnyvale, CA (US); Yuliang Guo, Sunnyvale, CA (US); Guang Chen, Sunnyvale, CA (US); Weide Zhang, Sunnyvale, CA (US); Ka Wai Tsoi, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 19 days.

(21) Appl. No.: 16/457,719

(22) Filed: Jun. 28, 2019

(65) Prior Publication Data

US 2020/0410260 A1   Dec. 31, 2020

(51) Int. Cl.
| | | |
|---|---|---|
| *G06K 9/00* | (2006.01) | |
| *G06T 11/20* | (2006.01) | |
| *G05D 1/00* | (2006.01) | |
| *G05D 1/02* | (2020.01) | |
| *B60W 30/09* | (2012.01) | |

(52) U.S. Cl.
CPC ......... *G06K 9/00805* (2013.01); *B60W 30/09* (2013.01); *G05D 1/0061* (2013.01); *G05D 1/0214* (2013.01); *G05D 1/0234* (2013.01); *G06K 9/00798* (2013.01); *G06T 11/203* (2013.01); *B60W 2420/42* (2013.01); *B60W 2552/00* (2020.02); *B60W 2554/80* (2020.02); *G05D 2201/0213* (2013.01)

(58) Field of Classification Search
CPC .......... G06K 9/00805; G06K 9/00798; B60W 30/09; B60W 2552/00; B60W 2554/80; B60W 2420/42; G05D 1/0061; G05D 1/0214; G05D 1/0234; G05D 2201/0213; G06T 11/203

See application file for complete search history.

(56) References Cited

U.S. PATENT DOCUMENTS

| | | | | |
|---|---|---|---|---|
| 5,612,881 A | * | 3/1997 | Moroto | G01C 21/3626 340/990 |
| 5,986,601 A | * | 11/1999 | Sugimoto | G01S 7/415 342/70 |
| 6,324,462 B1 | * | 11/2001 | Kageyama | G05D 1/0223 180/167 |
| 6,859,726 B2 | * | 2/2005 | Choi | G01C 21/3446 340/905 |

(Continued)

*Primary Examiner* — Manav Seth
(74) *Attorney, Agent, or Firm* — Womble Bond Dickinson (US) LLP (57) ABSTRACT

In one embodiment, in addition to detecting or recognizing an actual lane, a virtual lane is determined based on the current state or motion prediction of an ADV. A virtual lane may or may not be identical or similar to the actual lane. A virtual lane may represent the likely movement of the ADV in a next time period given the current speed and heading direction of the vehicle. If an object is detected that may cross a lane line of the virtual lane and is a closest object to the ADV, the object is considered as a CIPO, and an emergency operation may be activated. That is, even though an object may not be in the path of an actual lane, if the object is in the path of a virtual lane of an ADV, the object may be considered as a CIPO and subject to a special operation.

20 Claims, 8 Drawing Sheets

(56) References Cited

U.S. PATENT DOCUMENTS

| | | | | |
|---|---|---|---|---|
| 6,888,447 B2* | 5/2005 | Hori | G01S 13/867 | 340/435 |
| 7,487,074 B2* | 2/2009 | Ohtsu | G09B 19/167 | 463/6 |
| 8,126,642 B2* | 2/2012 | Trepagnier | G01S 17/86 | 701/423 |
| 8,140,241 B2* | 3/2012 | Takeda | G08G 1/166 | 701/93 |
| 8,144,195 B2* | 3/2012 | Nagaoka | H04N 7/18 | 348/148 |
| 8,225,651 B2* | 7/2012 | Scheepers | G01M 17/0072 | 73/116.01 |
| 8,280,623 B2* | 10/2012 | Trepagnier | G05D 1/024 | 701/301 |
| 8,509,480 B2* | 8/2013 | Takahashi | G06K 9/3233 | 382/103 |
| 8,666,716 B2* | 3/2014 | Yonekawa | G08G 1/166 | 703/8 |
| 8,706,394 B2* | 4/2014 | Trepagnier | G08G 1/16 | 701/301 |
| 8,849,514 B2* | 9/2014 | Sugawara | B60W 30/12 | 701/41 |
| 8,855,860 B2* | 10/2014 | Isaji | B60W 10/06 | 701/41 |
| 9,174,672 B2* | 11/2015 | Zeng | B60W 30/095 | |
| 9,199,668 B2* | 12/2015 | Zeng | G01S 13/931 | |
| 9,216,739 B2* | 12/2015 | Shibata | B60T 7/22 | |
| 9,399,464 B2* | 7/2016 | Kunihiro | B60W 30/10 | |
| 9,734,416 B2* | 8/2017 | Kanetake | G06T 7/269 | |
| 9,796,378 B2* | 10/2017 | Tsuruta | B60W 30/10 | |
| 9,868,443 B2* | 1/2018 | Zeng | B60W 30/16 | |
| 9,953,535 B1* | 4/2018 | Canavor | G05D 1/0289 | |
| 10,053,091 B2* | 8/2018 | Jiang | G08G 1/165 | |
| 10,614,716 B1* | 4/2020 | Canavor | G08G 1/09675 | |
| 2013/0274986 A1* | 10/2013 | Trepagnier | G05D 1/0214 | 701/26 |
| 2018/0247138 A1* | 8/2018 | Kang | G05D 1/0231 | |

* cited by examiner

METHOD FOR DETECTING CLOSEST IN-PATH OBJECT (CIPO) FOR AUTONOMOUS DRIVING

TECHNICAL FIELD

Embodiments of the present disclosure relate generally to operating autonomous vehicles. More particularly, embodiments of the disclosure relate to detecting closest in-path objects for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. When planning a path to autonomous drive a vehicle, one of most critical situations is to detect a closest in-path object (CIPO) that may cause a potential collision with an autonomous driving vehicle (ADV). It is important to detect such a CIPO because it may trigger an emergency operation to bring the ADV to a safe state. There has been a lack of efficient ways to detect CIPOs given the current states of the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, in addition to detecting or recognizing an actual lane, a virtual lane is determined based on the current state or motion prediction of an ADV. A virtual lane may or may not be identical or similar to the actual lane. A virtual lane may represent the likely movement of the ADV in a next time period given the current speed and heading direction of the vehicle. If an object is detected that may cross a lane line of the virtual lane and is a closest object to the ADV, the object is considered as a CIPO, and an emergency operation may be activated. That is, even though an object may not be in the path of an actual lane, if the object is in the path of a virtual lane of an ADV, the object may be considered as a CIPO and may be subject to a special operation.

According to one embodiment, a driving environment surrounding an ADV is perceived based on sensor data obtained from variety of sensors mounted on the ADV such as a camera, a LIDAR, or a RADAR device, including detecting and recognizing one or more moving objects. An operating state (e.g., a location, speed, heading direction) of the ADV is determined. A virtual lane associated with the ADV is determined based on the operating state of the ADV. The virtual lane represents a path along which the ADV likely will move within a predetermined time period. It is then determined whether at least a portion of a first object of the detected objects falls within the virtual lane. The first object may be classified as a CIPO in response to determining that at least a portion of the first object falls within the virtual lane. An emergency operation may be activated to control the ADV to avoid a collision with the first object if the first object is classified as a CIPO.

According to one embodiment, the virtual lane may be generated without using map data of a map associated with a road the ADV is currently located and without being based on an actual lane recognized based on the sensor data. Rather, the virtual lane is determined based on the ADV's current state and past states. In one embodiment, the virtual lane is determined by predicting the further movement of the ADV based on the vehicle state and the moving history of the ADV. In one embodiment, the lane length of the virtual lane may be calculated based on the current speed of the ADV and the predetermined time period. If an object falls within the virtual lane length, such an object will be considered as a CIPO. Similarly, the curvature or lane direction of the virtual lane may also be determined based on the current heading direction or steering angle of the ADV. A lane width of the virtual lane may be determined based on a physical dimension of the ADV. The lane width of the virtual lane may also be determined based on a type of the road (e.g., urban vs. rural roads, country or jurisdiction, highway vs. local roads) and a government traffic regulation.

In addition to the virtual lane, an actual lane may also be considered, where the actual lane may be determined based on map data or recognized via image processing on an image captured by a sensor. If there is another object falls across the actual lane, one of the objects detected on the actual lane and the virtual lane that has the shortest distance with respect to the current location of the ADV is considered as a CIPO. In determining a virtual lane, one or more lane lines are determined to define shape and/or length of the virtual lane.

For example, if there is already one lane line existed based on the perception, the other lane line is determined. If there is no lane line available from the perception or map data, both lane lines are determined.

Figure 1:
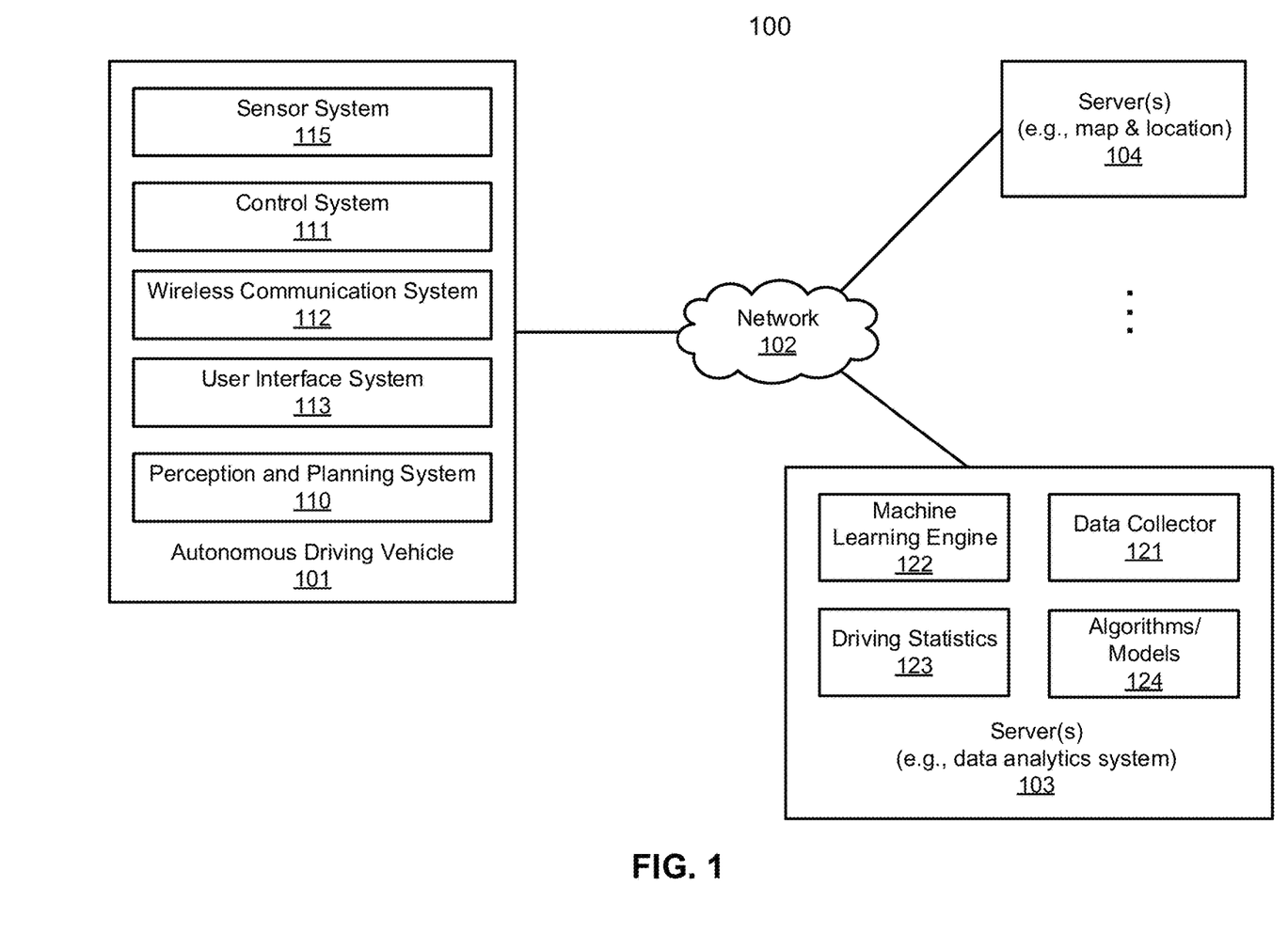
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
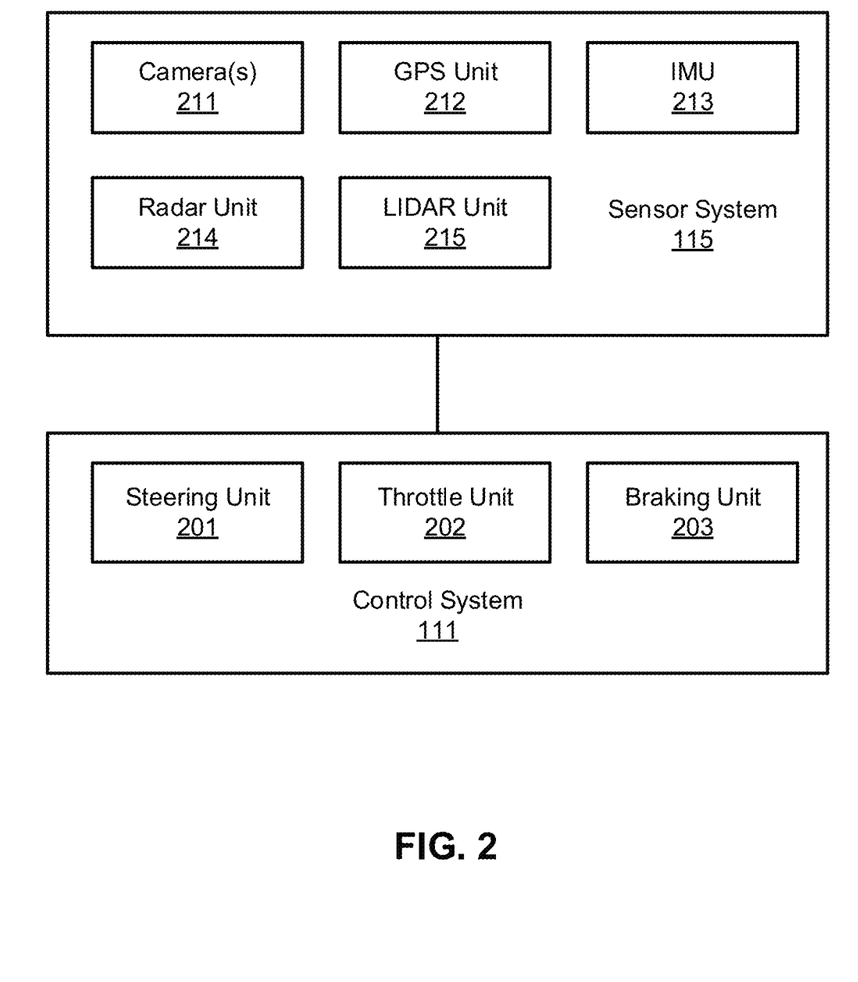
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include CIPO classification algorithms or rules, including an algorithm to determine a virtual lane. Algorithms 124 can then be uploaded on ADVs to be utilized during autonomous driving in real-time.

Figure 3A:
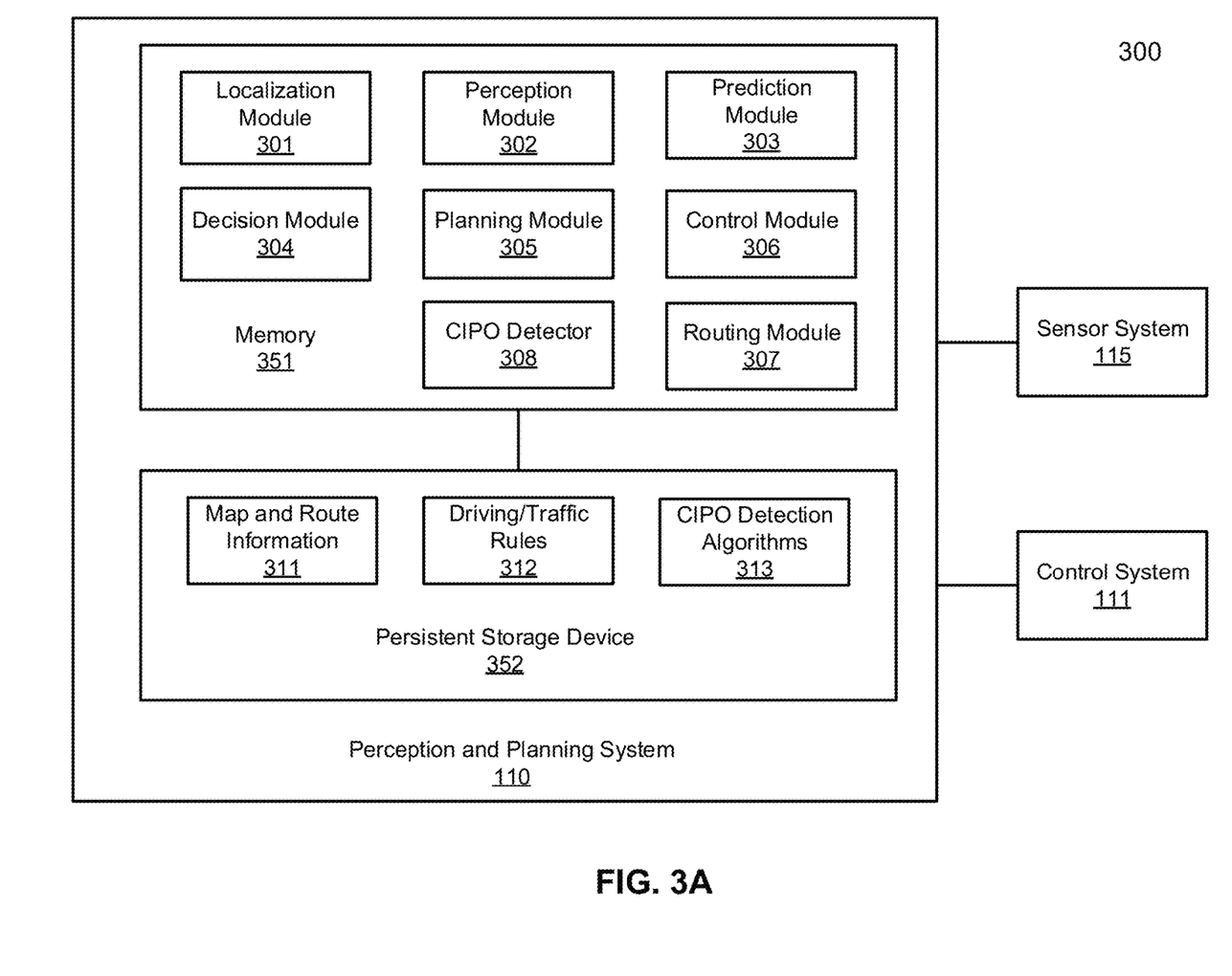
FIGS. 3A-3B are block diagrams illustrating an example of a perception and planning system used with an autonomous vehicle according to one embodiment.
Figure 3B:
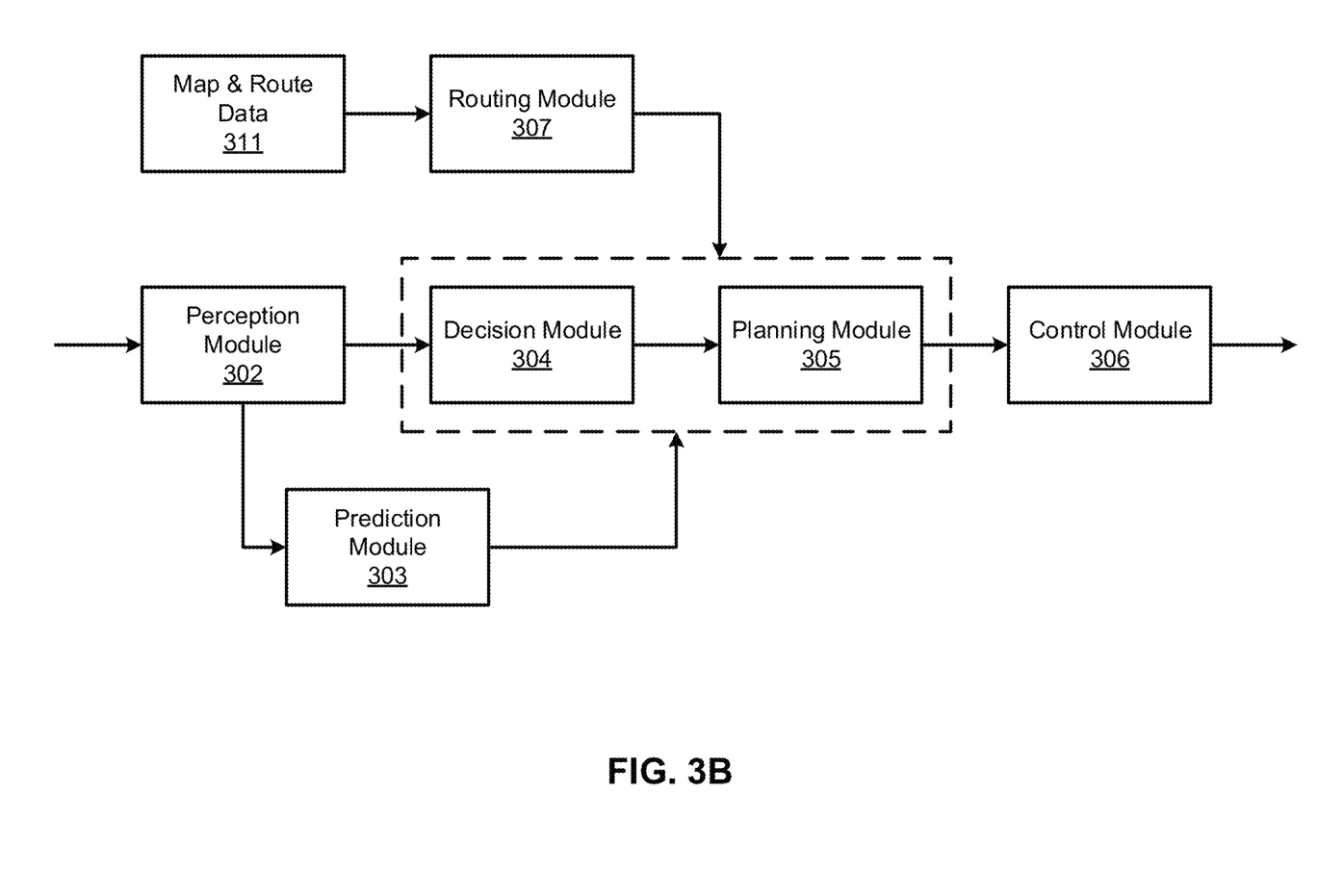

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and CIPO detector 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, CIPO detector 308 is configured to detect whether an object may fall within a path of the ADV to be classified as a CIPO based on the current vehicle states of the ADV using CIPO detection algorithms or rules 313. For example, a virtual driving environment may be created based on the vehicle states of the ADV, including a virtual lane along which the ADV may move during a next predetermined time period, where the virtual lane may or may not be identical to an actual lane. If an object falls within either the actual lane or virtual lane, the object may be considered as a CIPO. That is, an object may not be considered as a CIPO based on the movement prediction of the object in view of an actual lane, however, the same object may considered as a CIPO in view of the virtual lane and the current vehicle state of the ADV. CIPO detector 308 may be integrated with perception module 302.

Figure 4:
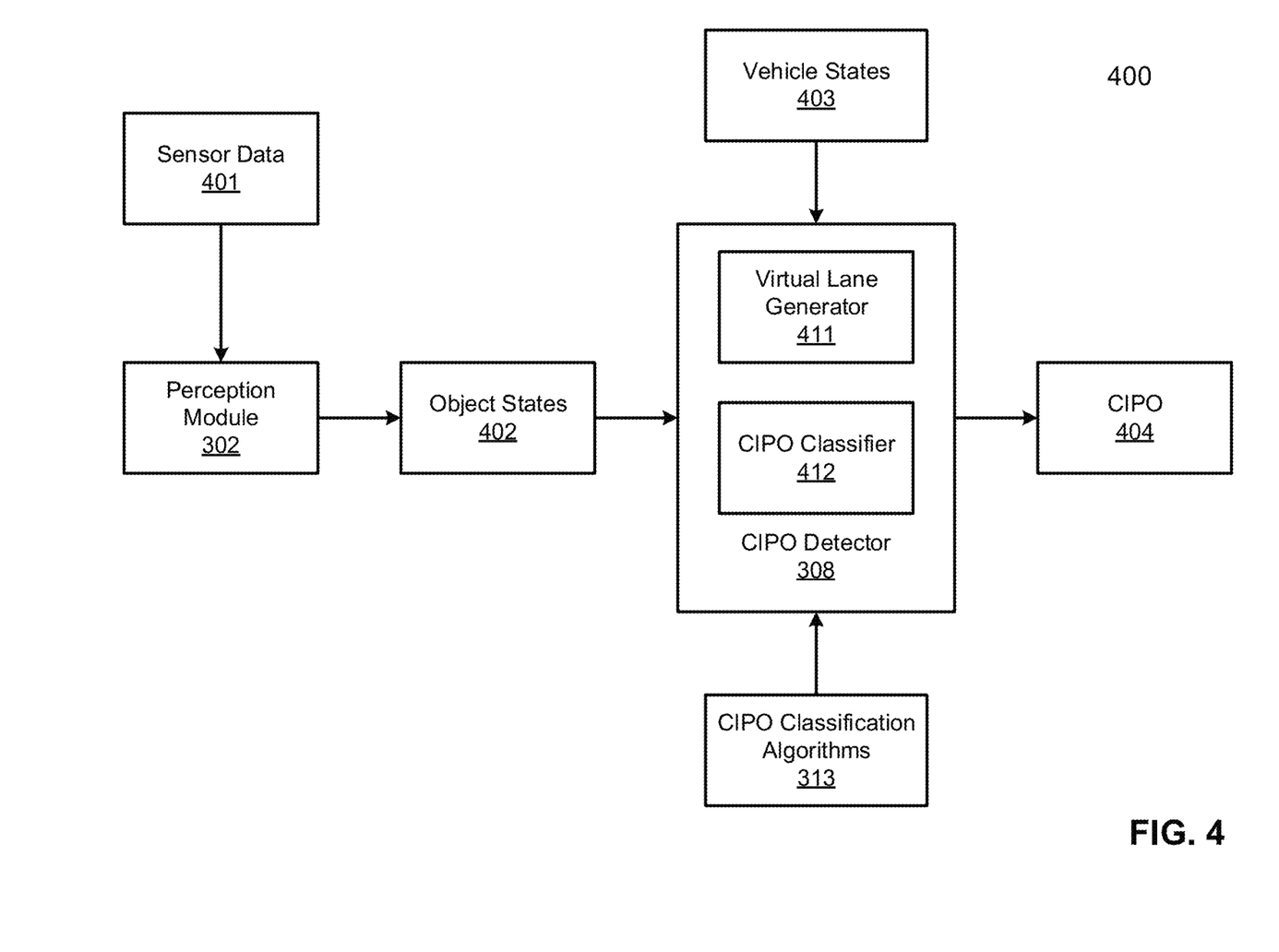
FIG. 4 is a block diagram illustrating a closest in-path object (CIPO) detection system according to one embodiment.

FIG. 4 is a block diagram illustrating an example of a CIPO detector according to one embodiment. Referring to FIG. 4, CIPO detector 308 includes, among others, virtual lane generator 411 and CIPO classifier 412. In one embodiment, virtual lane generator 411 is configured to generate a virtual lane based on the objects states 402 of one or more objects detected by perception module 302 based on the sensor data 401 and vehicle states 403. An object state of an object includes information describing current and past locations, speeds, and heading directions of an object. Such information may be stored in an object buffer specifically allocated to store and keep track the movement of the object. Similarly, a vehicle state includes information describing current and past locations, speeds, and heading directions of the ADV.

According to one embodiment, perception module 302 perceives a driving environment surrounding an ADV based on sensor data 401 obtained from variety of sensors mounted on the ADV such as a camera, a LIDAR, or a RADAR device, including detecting and recognizing one or more moving objects. Operating states 403 (e.g., a location, speed, heading direction) of the ADV is determined, which may be logged by a logger and stored in a persistent storage device.

Virtual lane generator 411 determines a virtual lane associated with the ADV based on the operating states 403 of the ADV. The virtual lane represents a path along which the ADV likely will move within a predetermined time period. CIPO classifier 412 determines whether at least a portion of a first object of the detected objects falls within the virtual lane based on a set of CIPO classification rules 313. The first object may be classified as a CIPO in response to determining that at least a portion of the first object falls within the virtual lane. A predetermined operation associated with a CIPO (e.g., emergency action) may be activated to control the ADV to avoid a collision with the first object if the first object is classified as a CIPO.

According to one embodiment, the virtual lane may be generated without using map data of a map associated with a road the ADV is currently located and without being based on an actual lane recognized based on the sensor data. Rather, the virtual lane is determined based on the ADV's current state and past states 403. In one embodiment, the virtual lane is determined by predicting the further movement of the ADV based on the vehicle state and/or the moving history of the ADV 403. In one embodiment, the lane length of the virtual lane may be calculated based on the current speed of the ADV and the predetermined time period (e.g., 3-5 seconds). If at least a portion of an object falls within the virtual lane length, such an object may be considered as a CIPO. Similarly, the curvature or lane direction of the virtual lane may also be determined based on the current heading direction or steering angle of the ADV. A lane width of the virtual lane may be determined based on a physical dimension of the ADV such as the vehicle width. The lane width of the virtual lane may also be determined based on a type of the road (e.g., urban vs. rural roads, country or jurisdiction, highway vs. local roads) and a government traffic regulation (e.g., minimum clearance space).

In addition to the virtual lane, an actual lane may also be considered, where the actual lane may be determined based on map data or recognized via image processing on an image captured by a sensor. If there is another object falls across the actual lane, one of the objects detected on the actual lane and the virtual lane that has the shortest distance with respect to the current location of the ADV is considered as a CIPO. In determining a virtual lane, one or more lane lines are determined to define shape and/or length of the virtual lane. For example, if there is already one lane line existed based on the perception, the other lane line is determined. If there is no lane line available from the perception or map data, both lane lines are determined.

Figure 5:
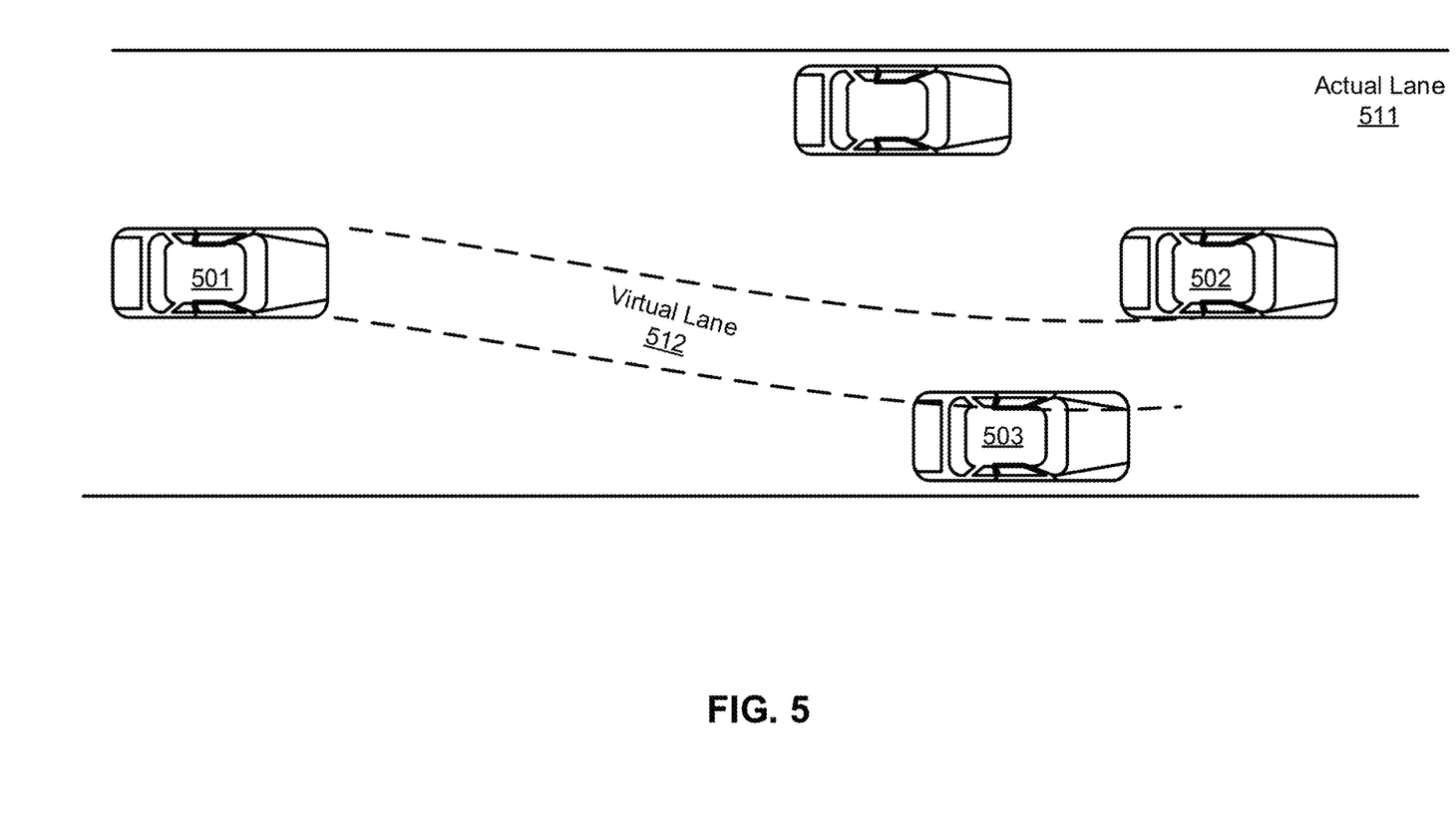
FIG. 5 is a diagram illustrating a process of detecting a CIPO according to one embodiment.

FIG. 5 is a diagram illustrating a process of detecting a CIPO according to one embodiment. Referring to FIG. 5, in this example, ADV 501 is traveling within actual lane 511 and object 502 is moving in front of ADV 501. Object 503 is moving within adjacent actual lane 512. Thus based on the actual lane configuration of lane 511, object 502 may be considered as a CIPO while object 503 may not considered as a CIPO because object 503 is not in the path of ADV 501. However, based on the current vehicle state such as the speed and heading direction of ADV 501, virtual lane 512 is determined. In view of the relative location of object 503 and virtual lane 512, at least a portion of object 503 falls within virtual lane 512. In this situation, both objects 502 and 503 can potentially be CIPOs. In one embodiment, a first distance between object 502 and ADV 501 and a second distance between object 503 and ADV 501 are measured. If the first distance is shorter than the second distance, object 502 is considered as a CIPO. Likewise, if the second distance is shorter than the first distance, object 503 is considered as a CIPO.

Figure 6:
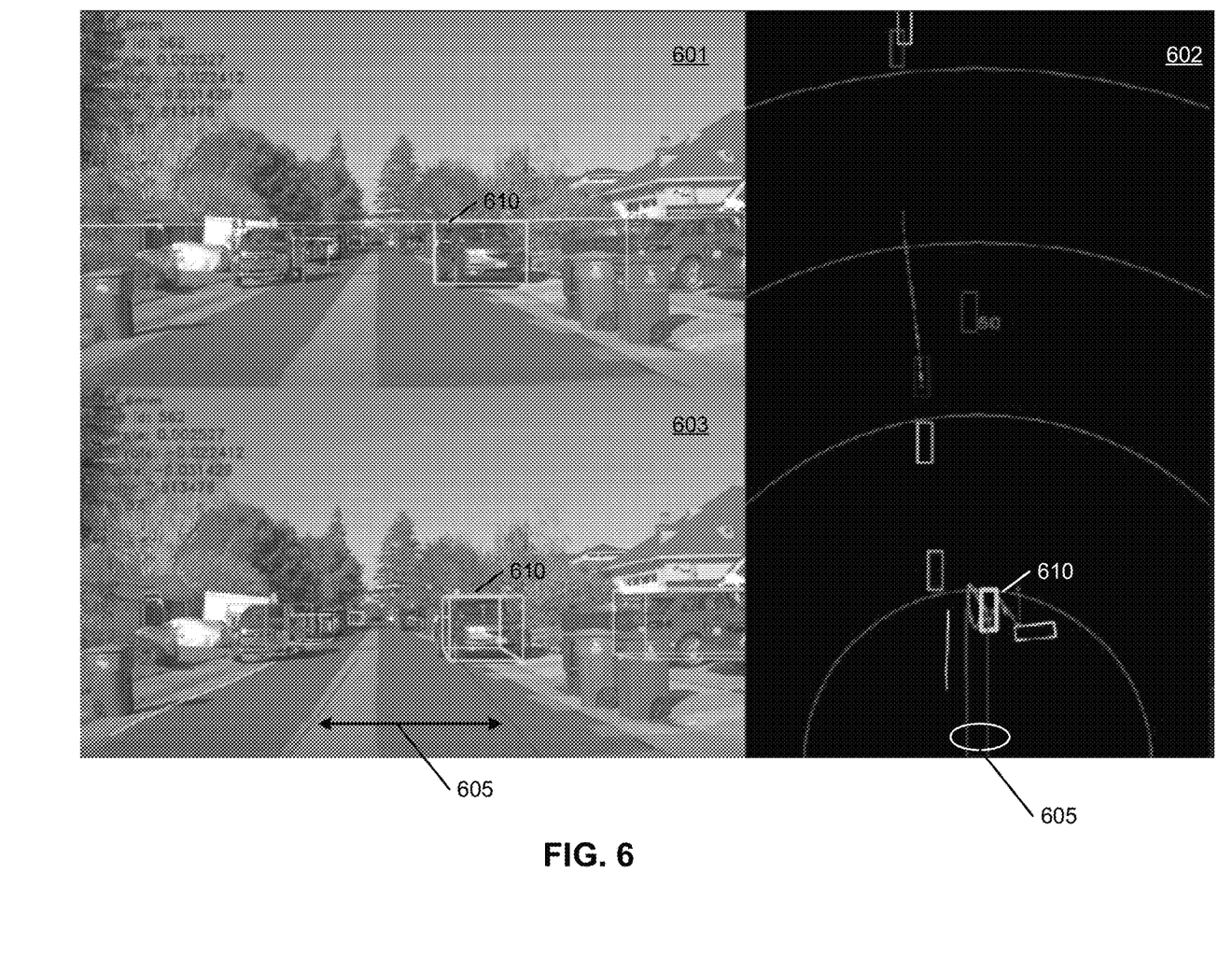
FIG. 6 is a screenshot illustrating a graphical user interface of an autonomous driving system according to one embodiment.

FIG. 6 is a screenshot illustrating a graphical user interface (GUI) of an autonomous driving system according to one embodiment. Referring to FIG. 6, the GUI as shown may be displayed on a display device within an ADV. In this example, image 601 is captured by a camera of the ADV and processed by a perception process including detecting object surrounding by a bounding box 610. Image 601 represents a two-dimensional (2D) view from a viewpoint of the ADV and displayed on a first display area of the display device. Image 602 is generated based on image 601 and other sensor data such as sensor data obtained from other sensors (e.g., LIDAR, RADAR) and displayed on a second display area of the display device. Image 602 represents a 3D view, i.e., a top-down view. Image 603 is another 2D view that is generated by re-projecting 3D view 602 back to a 2D view, referred to as a re-projected 2D view.

As shown in FIG. 6, the ADV is driving within an actual lane and based on the vehicle states of the ADV (e.g., location, speed, and heading direction), virtual lane 605 is generated. As shown in 3D view 602 and re-projected 2D view, at least a portion of object 610 falls within virtual lane 605. Thus, object 610 may be classified as a CIPO in this example.

Figure 7:
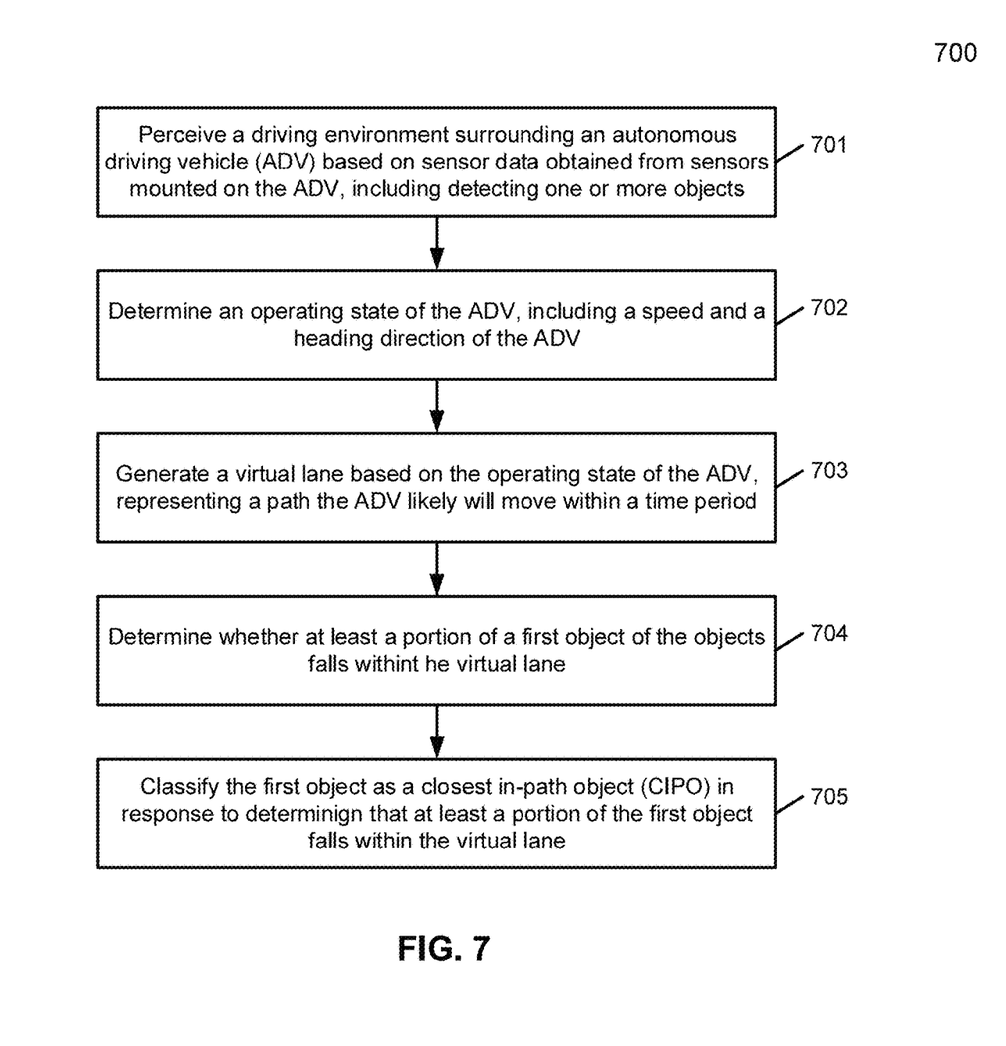
FIG. 7 is a flow diagram illustrating a method of detecting a CIPO according to one embodiment.

FIG. 7 is a flow diagram illustrating a process of detecting a CIPO according to one embodiment. Process 700 may be performed by processing logic which may include software, hardware, or a combination thereof. For example, process 700 may be performed by perception module 302 and/or CIPO detector 308. Referring to FIG. 7, at block 701, processing logic perceives a driving environment surrounding an ADV based on sensor data obtained from a number of sensors mounted on the ADV, including detecting or recognizing one or more objects (e.g., moving objects such as vehicles, bikes, pedestrians). At block 702, processing logic determines an operating state of the ADV, including a speed and a heading direction of the ADV. The operating state of the ADV may also be determined based on the operating history of the ADV, which may be recorded and maintained in a persistent storage device within the ADV. At block 703, processing logic generates a virtual lane (also referred to as a pseudo lane) based on the operating state of the ADV. The virtual lane represents a path along which the ADV likely will follow within a next predetermined time period. The virtual lane may be identical to the actual lane or may deviate from the actual lane due to the speed and heading direction of the ADV. At block 704, it is determined whether at least a portion of at least one of the detected objects falls within the virtual lane. If so, at block 705, that object may be classified as a CIPO.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for detecting closest in-path objects for autonomous driving, the method comprising:
    perceiving a driving environment surrounding an autonomous driving vehicle (ADV) based on sensor data obtained from a plurality of sensors mounted on the ADV, including detecting one or more objects;
    determining an operating state of the ADV including a speed and a heading direction of the ADV;
    generating a virtual lane based on the operating state of the ADV, the virtual lane representing a path along which the ADV likely will move within a predetermined time period;
    determining whether at least a portion of a first object of the detected objects falls within the virtual lane; and
    classifying the first object as a closest in-path object (CIPO), in response to determining that at least a portion of the first object falls within the virtual lane.

2. The method of claim 1, further comprising activating an emergency operation to control the ADV to avoid a collision with the first object, in response to determining that the first object is a CIPO.

3. The method of claim 1, wherein the virtual lane is generated without using map data of a map associated with a road the ADV is currently located and without being based on an actual lane of the road recognized based on the sensor data.

4. The method of claim 1, wherein generating a virtual lane comprises:
    determining a virtual lane length based on the speed of the ADV and the predetermined time period;
    determining a curvature of the virtual lane based on the heading direction of the ADV; and
    determining a virtual lane width of the virtual lane based on a physical dimension of the ADV.

5. The method of claim 4, wherein the virtual lane width is determined further based on at least one of a type of road or a traffic regulation.

6. The method of claim 1, further comprising:
    detecting a second object within an actual lane recognized based on the perceived driving environment that the ADV likely collides within the predetermined time period based on the operating state of the ADV;
    measuring a first distance between the ADV and the first object and a second distance between the ADV and the second object; and
    designating the first object as the CIPO if the first distance is shorter than the second distance.

7. The method of claim 1, wherein generating the virtual lane comprises determining a first lane line and a second lane line to define a shape and a lane width of the virtual lane.

8. The method of claim 7, wherein the first lane line is determined based on at least one of map data or a lane mark recognized based on perceived driving environment, and wherein the second lane line is derived from the first lane line in view of a set of rules.

9. A non-transitory machine-readable medium having instructions stored therein, which when executed by a processor, cause the processor to perform operations, the operations comprising:
    perceiving a driving environment surrounding an autonomous driving vehicle (ADV) based on sensor data obtained from a plurality of sensors mounted on the ADV, including detecting one or more objects;
    determining an operating state of the ADV including a speed and a heading direction of the ADV;
    generating a virtual lane based on the operating state of the ADV, the virtual lane representing a path along which the ADV likely will move within a predetermined time period;

determining whether at least a portion of a first object of the detected objects falls within the virtual lane; and classifying the first object as a closest in-path object (CIPO), in response to determining that at least a portion of the first object falls within the virtual lane.

10. The machine-readable medium of claim 9, wherein the operations further comprise activating an emergency operation to control the ADV to avoid a collision with the first object, in response to determining that the first object is a CIPO.

11. The machine-readable medium of claim 9, wherein the virtual lane is generated without using map data of a map associated with a road the ADV is currently located and without being based on an actual lane of the road recognized based on the sensor data.

12. The machine-readable medium of claim 9, wherein generating a virtual lane comprises:

determining a virtual lane length based on the speed of the ADV and the predetermined time period;

determining a curvature of the virtual lane based on the heading direction of the ADV; and determining a virtual lane width of the virtual lane based on a physical dimension of the ADV.

13. The machine-readable medium of claim 12, wherein the virtual lane width is determined further based on at least one of a type of road or a traffic regulation.

14. The machine-readable medium of claim 9, wherein the operations further comprise:

detecting a second object within an actual lane recognized based on the perceived driving environment that the ADV likely collides within the predetermined time period based on the operating state of the ADV;

measuring a first distance between the ADV and the first object and a second distance between the ADV and the second object; and designating the first object as the CIPO if the first distance is shorter than the second distance.

15. The machine-readable medium of claim 9, wherein generating the virtual lane comprises determining a first lane line and a second lane line to define a shape and a lane width of the virtual lane.

16. The machine-readable medium of claim 15, wherein the first lane line is determined based on at least one of map data or a lane mark recognized based on perceived driving environment, and wherein the second lane line is derived from the first lane line in view of a set of rules.

17. A data processing system, comprising:

a processor; and a memory coupled to the processor to store instructions, which when executed by the processor, cause the processor to perform operations, the operations including perceiving a driving environment surrounding an autonomous driving vehicle (ADV) based on sensor data obtained from a plurality of sensors mounted on the ADV, including detecting one or more objects, determining an operating state of the ADV including a speed and a heading direction of the ADV, generating a virtual lane based on the operating state of the ADV, the virtual lane representing a path along which the ADV likely will move within a predetermined time period, determining whether at least a portion of a first object of the detected objects falls within the virtual lane, and classifying the first object as a closest in-path object (CIPO), in response to determining that at least a portion of the first object falls within the virtual lane.

18. The system of claim 17, wherein the operations further comprise activating an emergency operation to control the ADV to avoid a collision with the first object, in response to determining that the first object is a CIPO.

19. The system of claim 17, wherein the virtual lane is generated without using map data of a map associated with a road the ADV is currently located and without being based on an actual lane of the road recognized based on the sensor data.

20. The system of claim 17, wherein generating a virtual lane comprises:

determining a virtual lane length based on the speed of the ADV and the predetermined time period;

determining a curvature of the virtual lane based on the heading direction of the ADV; and determining a virtual lane width of the virtual lane based on a physical dimension of the ADV.

* * * * *